July 10, 1928.

F. A. HAUGHTON 1,676,985

AUTOMATIC ARC WELDING MACHINE

Filed Sept. 14, 1925     3 Sheets-Sheet 1

Inventor:
Frank A. Haughton
by
His Attorney.

July 10, 1928.

F. A. HAUGHTON 1,676,985

AUTOMATIC ARC WELDING MACHINE

Filed Sept. 14, 1925     3 Sheets-Sheet 2

Inventor:
Frank A. Haughton,
by *Alexander F. [signature]*
His Attorney

July 10, 1928.
F. A. HAUGHTON
1,676,985
AUTOMATIC ARC WELDING MACHINE
Filed Sept. 14, 1925    3 Sheets-Sheet 3
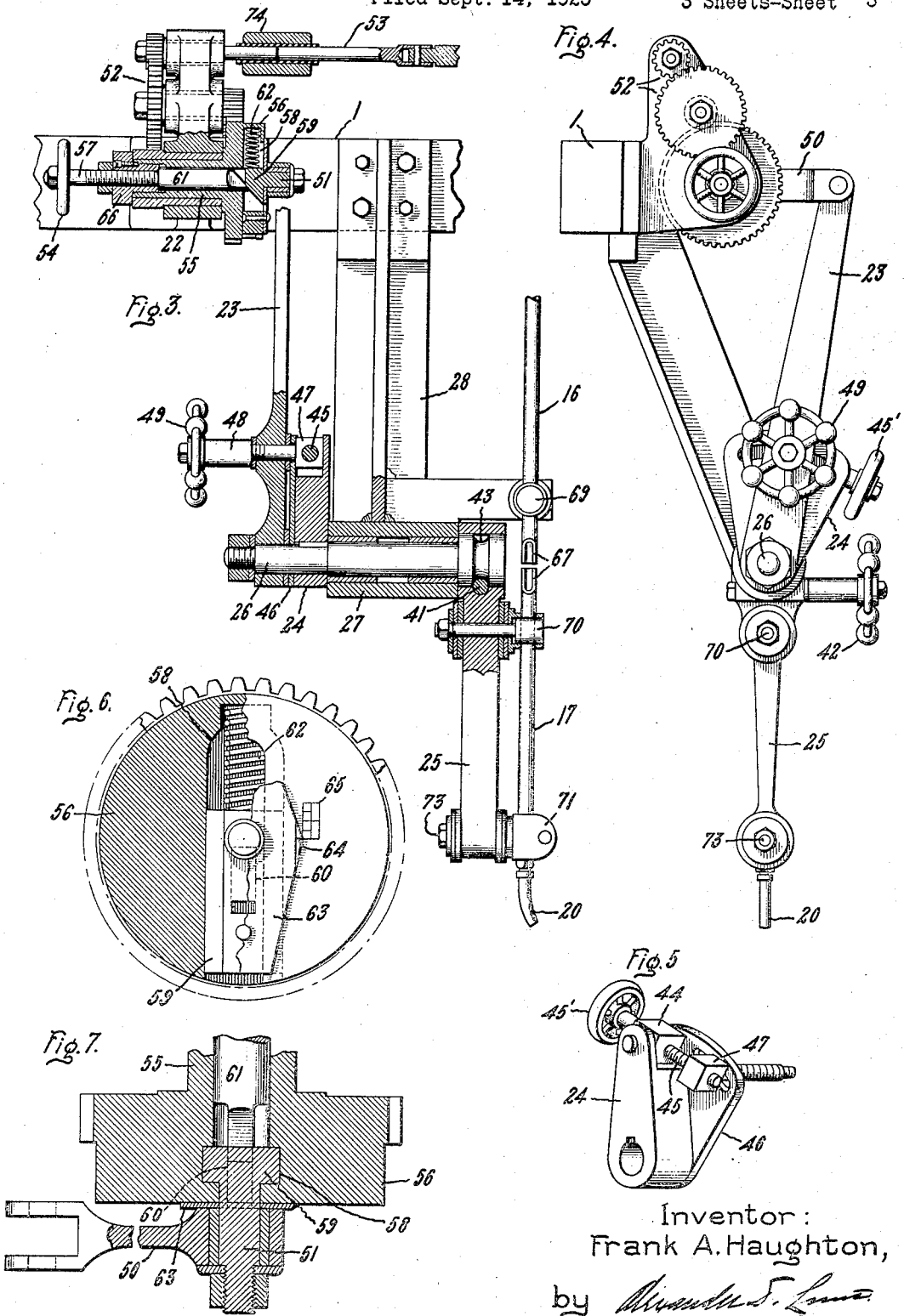
Inventor:
Frank A. Haughton,
by
His Attorney Patented July 10, 1928.

1,676,985

UNITED STATES PATENT OFFICE.

FRANK A. HAUGHTON, OF SCHENECTADY, NEW YORK, ASSIGNOR TO GENERAL ELECTRIC COMPANY, A CORPORATION OF NEW YORK.

AUTOMATIC ARC-WELDING MACHINE.

Application filed September 14, 1925. Serial No. 56,108.

In practicing the art of electric arc welding it has been found desirable in many kinds of work to oscillate or move the electrode back and forth across the seam as it is being welded to secure thereby a more even distribution of the heat generated by the arc. This is particularly desirable when the electrode is formed of a fusible welding material since it gives in addition to a distribution of the heat a more even distribution of the welding material and permits the formation of a weld of greater width than a given size electrode could ordinarily cover without such movement. It is also often desirable to obtain while welding a quick and minute adjustment of the electrode for position independent of any oscillatory movement.

An object of my invention is to provide an automatic oscillating gear which is so arranged that an adjustment for amplitude of oscillation and alignment may be made without interruption to the welding operation or without danger to the operator.

A further object is to provide in such an oscillating gear a conduit for the electrode which will permit oscillatory movement of the electrode and be capable of folding up laterally away from the work with a part of the oscillatory gear to provide room for facilitating placing the work in the machine or removing it therefrom.

Other objects of my invention will be made to appear in the course of the following specification in which I have shown one form of my invention.

Machines designed to weld steel tank seams or to unite along their length any two pieces of metal are provided with some means for securing relative movement between the work and the welding head. Some machines are provided with a bridge or arm having a carriage or carriages upon which the automatic welding head or heads are positioned. A preferred form of such a carriage is shown by way of illustrating the present invention.

Figure 1:
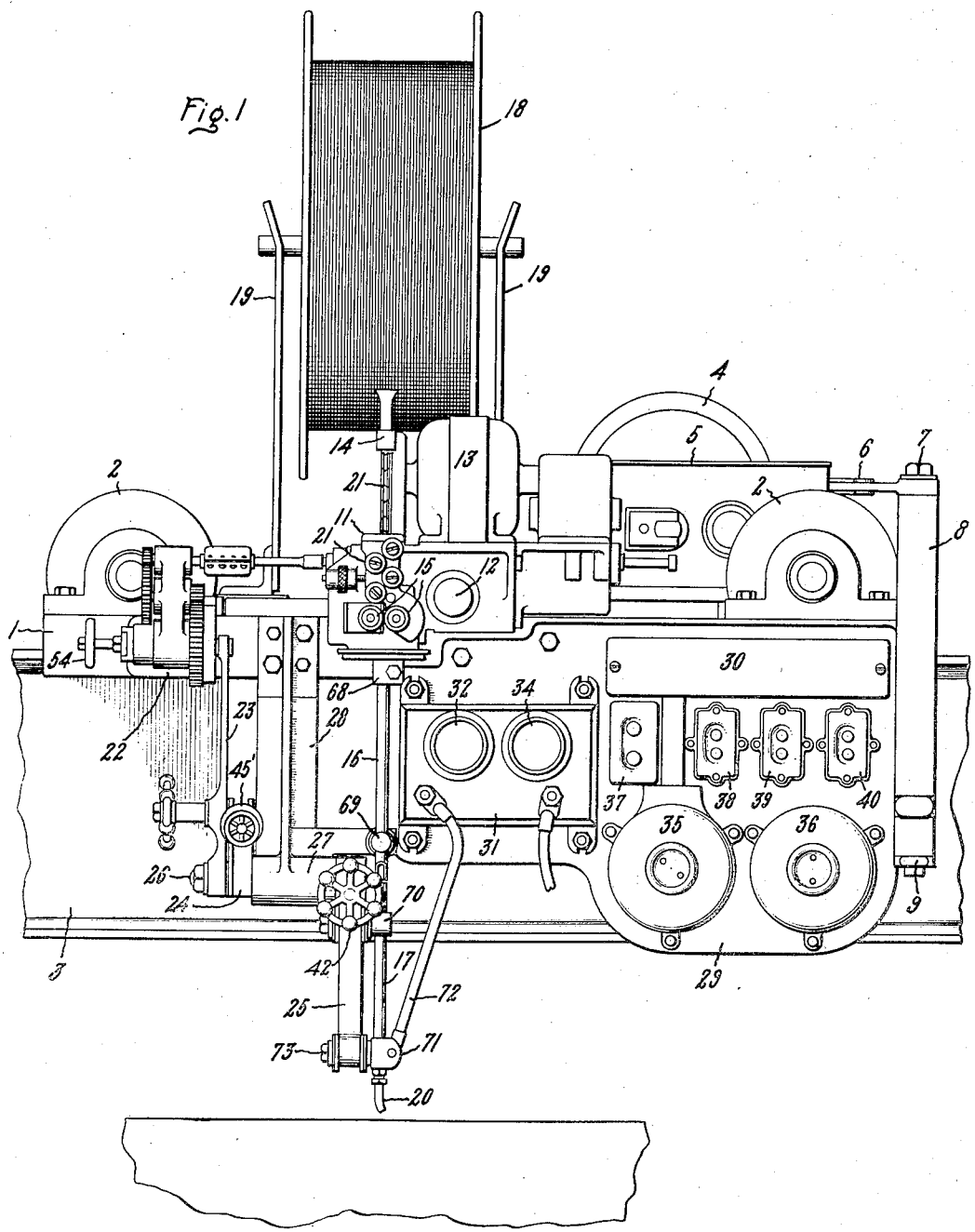
Figure 2:
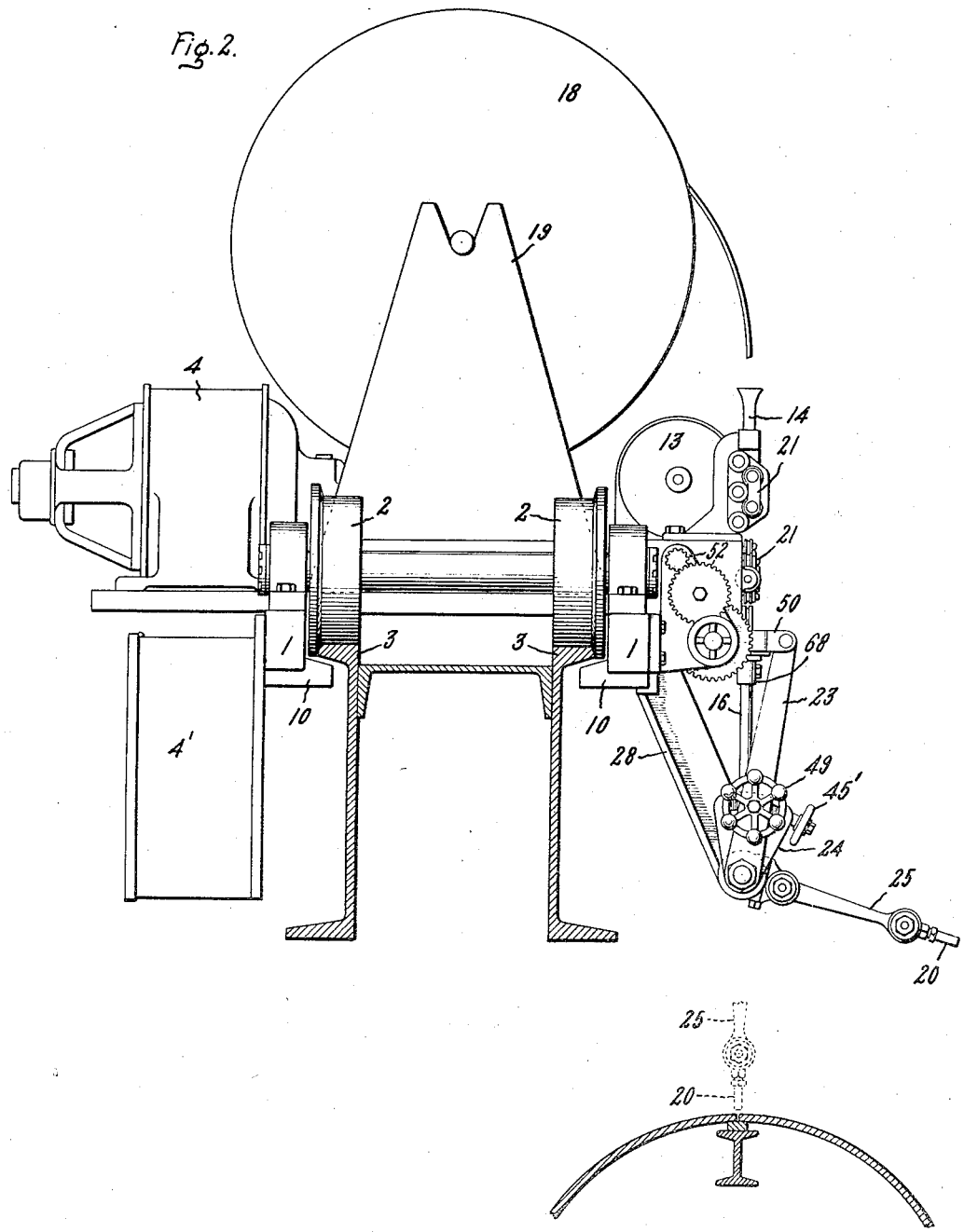

In the drawings, Figs. 1 and 2 show, respectively front and side elevations of a carriage embodying my invention; Figs. 3 and 4 show in greater detail the oscillating gear of my invention, together with the electrode conduit for conducting the wire from the welding head to the work; and Figs. 5, 6 and 7 are details of parts of the oscillating gear shown in Figs. 3 and 4.

In Figs. 1 and 2 of the drawings the welding carriage is shown as provided with flanged wheels 2 that roll on a suitable track 3 made of structural forms. This carriage is propelled by an adjustable speed motor 4 mounted with its control panel 4' on the back of the carriage. It is connected to the shaft of two of the wheels of the carriage through a gear train enclosed in box 5 and a clutch not apparent. The clutch is operated by a lever 6 which is in turn operated by a vertical shaft 7 mounted in a sleeve 8 attached to the frame of carriage 1. Shaft 7 has secured to it at its lower end a lever arm or handle 9 by which it may be rotated. The provision of this clutch permits the carriage to be quickly positioned at any point along the track or returned to the starting point of a new weld after the completion of the previous weld. By propelling the carriage by driving wheels in frictional engagement with the track I provide a convenient means for stopping the carriage without injury to its driving parts, should it encounter any obstruction left upon the track, since, in such a case, the wheels will simply slide around on the track without exerting undue stress upon the propelling mechanism. To prevent the carriage being accidentally thrown off the track gibs 10 are provided as shown in Fig. 2, which lap under the flanges of the rails 3 with a sufficient space intervening so as not to rub on the rails when the carriage is in motion.

11 is the welding head which is carried on a stud 12 insulated from the frame, and provided with a wire feed motor 13. 15 designates the wire feed rolls and 16 and 17 are two tubes for guiding the electrode wire from the reel 18 mounted in standards 19 upon the carriage 1 to nozzle 20 located at the lower end of tube 17. 21 designates two sets of rolls for straightening the electrode wire as it is unrolled, and 14 is a guide for directing the electrode wire to the straightening rolls.

22 designates an adjustable throw crank mechanism for oscillating the electrode at the point of welding. The motion of this crank is imparted to the nozzle by means of levers 23, 24 and 25 mounted on a rocker shaft 26 positioned in a bearing 27 carried by a bracket 28 attached to the frame of the carriage.

29 is a combined panel board and junction box, 30 being the junction box portion. 31 is a small panel on which is mounted a volt meter 32 and an ammeter 34 which indicate the welding current and the voltage across the arc. 35 is a rheostat that regulates the speed of the carriage travel motor 4 and 36 is a rheostat that regulates the speed of the wire feed motor 13. 37, 38, 39 and 40 are push buttons for controlling the operation of the carriage travel and electrode feed motors.

It will thus be seen that I have arranged within the ready reach of the operator the various control means so that the operator's vision may be concentrated on the arc while in the act of making the several adjustments.

In order to transmit to the carriage the welding current and the current supplied to the feed motor, carriage travel motor, and control circuits, I employ flexible cables extending from a convenient neighboring fixed point to the carriage and provide sufficient slack in these cables to permit the free travel of the carriage over its entire range of movement. It is apparent that buses from which the current would be conducted to the carriage by suitable collectors may be arranged parallel to the track to accomplish this same purpose.

Referring to Figs 3, 4, 5, 6 and 7, which show in greater detail distinctive features of my invention, bearing 27 mounted in bracket 28 carries a freely fitting shaft 26 on which are mounted the arms or levers 23, 24 and 25. In the lever 25, near its point of suspension, there is a clamp bolt 41 which is tightened or loosened by a hand wheel 42. When the lever 25 is in place on the shaft the bolt 41 engages a groove 43 in the shaft 26. This permits lever 25 being rotated with respect to the shaft 26 but prevents it from slipping off of the shaft endwise. Lever 25 is slit near the bolt 41 to permit it being clamped on the shaft 26 by the clamping bolt 41. When bolt 41 is loosened by the hand wheel 42 the lever 25 may be rotated or swung on the shaft 26 and set in any desired position. By tightening this bolt, the lever 25 is rigidly fixed to shaft 26.

Lever arm 24 is keyed to the shaft 26. As is best shown in Fig 5, it is provided with a swiveling block 44 through which an adjusting screw 45, provided with a hand wheel 45', passes and acts as a bearing for the screw 45. Forming a part of lever 24 and in the side of it adjacent to lever 23 is a slotted sector 46. Passing through the slot in this sector is a square headed bolt 47. The head of this bolt is drilled and tapped to receive the threaded portion of the adjusting screw 45; and the shank of the bolt 47, after passing through the slot in the sector 46, enters a closely fitting hole in the lever 23, as shown in Fig. 3. The threaded portion of the bolt 47 is provided with a clamping nut 48 which is actuated by a hand wheel 49.

Lever 23 is mounted on the shaft 26 and may rotate thereon except as governed by the adjusting screw 45 which moves the lever 24 to or from the bolt 47 and thereby causes the shaft to rotate in relation to the lever 23. The latter, however, by being fixed at its upper end by a link 50 to the crank pin 51 of the adjustable throw crank 22, causes the shaft to rotate in its own bearing 27 and in turn impart an angular movement to lever 25 about the axis of the shaft as a center. The relative lever lengths and adjusting screw thread pitch are such that a considerable degree of rotation of the hand wheel 45' results in a small angular movement of the lever 25 and in turn the electrode delivered by the nozzle 20 to the welding point. It is apparent that the relative adjustment of levers 23 and 24 might be secured in any one of a plurality of ways, and I do not intend to be limited to the particular embodiment illustrated and described.

For the purpose of oscillating the electrode transversely to the seam being welded, the upper end of lever 23 is connected by a link 50 to the adjustable throw crank 22. This crank is driven by a train of gears 52 which in turn is driven by a shaft 53 which is an extension of a shaft in the welding head. Adjustment of the throw of this crank is obtained by rotating the hand wheel 54.

In this adjustable throw crank 55 is a hollow shaft having a slotted disc 56 at one end and an adjusting screw 57 at the other end. In the T slot 58 located in the face of the slotted disc 56 there is carried a T block 59 having integral with it the crank pin 51. In this block there is an angular slot 60 shown in Figs. 3 and 7. Within the hollow shaft 55 is a sliding finger 61 against one end of which the adjusting screw 57 abuts. The other end of this finger piece terminates in an angular projection corresponding in angle with the angular slot 60 in block 59. This angular projection engages the angular surface of the slot 60 and the two angular surfaces are held in engagement by a spring 62 located in the slotted disc 56. The adjusting screw 57 is carried by a plug 66 which is secured to the end of the shaft 55. The inner end of this plug forms a shoulder stop for finger 61 and is so proportioned that when the finger is in contact with the shoulder the axis of the crank pin 51 coincides with the axis of the hollow shaft. Rotation of the latter with the parts in this position, as shown in Fig. 3, will result in no crank throw. Consequently the lever 23 will be held stationary by the link 50 and no oscillation will be imparted to the electrode. By forcing the crank pin off the axis of the hollow shaft the axis of the latter will begin to describe a circular path and through the link 50 will impart an oscillating movement to the lever 23, and in turn to the electrode at the nozzle 20. A thin plate 63 acts as a cover to close the T slot 58 in the disc 56. This plate is provided with an index line 64 which registers with graduation 65 on the disc 56 by means of which the throw of the crank can be set at the desired amount.

It is apparent that by my arrangement of parts the operator may, while concentrating his vision on the electrode, observe whether the path being covered by the weld is correctly located transversely to the desired line of welding, and if any adjustment is required he may immediately accomplish this by releasing clamping nut 48 and turning the hand wheel 45' in the desired direction without interrupting the progress of the weld and with his vision still concentrated on the arc. After the desired adjustment has been made, the clamping nut 48 is tightened by means of hand wheel 49. This clamps lever 23 firmly to lever 24 and prevents any accidental movement of the adjusting screw or movement due to backlash.

An oscillating movement is used when a weld is required of greater width than a given size electrode can cover without such movement. It should be recognized, however, that in my arrangement just described the mechanism for imparting this oscillatory movement should be considered as an individual element for, as has already been shown, when the crank pin is set for zero throw, the lever 23 stands stationary and no oscillation of the electrode results. The positioning features of the mechanism are nevertheless fully available, and this will more clearly be recognized if we consider the lever 23 a permanently rigid part of the carriage. A machine for work not requiring oscillation may be equipped with these adjustable features without the oscillating gear.

The electrode wire carried by reel 18, after passing the driving rolls 15, is guided by a tube 16, thence by a tube 17 to a nozzle 20, as above described. It is of course apparent to one skilled in the art that by a suitable construction tube 17 and its supporting lever 25 might be replaced by a single member embodying the features of both these elements. The center of the wire is located so as to intersect the axis of the shaft 26. In placing work into a machine, of which my improved carriage forms a part, it has often been found desirable to have ample space to avoid striking the nozzle or lower part of the lever 25 against the work. In order to provide ample space, by my arrangement, the hand wheel 42 is loosened and the lever 25, then free to swing around on the shaft 26, is raised to a position such as shown in Fig. 2.

This causes the wire electrode to bend at the axis of the shaft 26 and take a permanent set. To prevent the bend being very short the ends of the tubes 16 and 17 that are adjacent to each other have their front portions cut away as shown at 67 in Fig. 3. This causes the wire to bend with a long curvature. As the movement is sufficient to give the wire a permanent set, the ends of the tubes are cut away only on the front sides. This leaves back portions to act as supports for the wire to straighten it out when the lever 25 is returned to its normal position for welding as shown in dotted lines in Fig. 2.

The tube 16 is positioned at its upper end by inserting it in a freely fitting hole in the bracket 68 attached to the welding head. At its lower end it is clamped permanently in position by a clamping bolt 69. Means are provided for insulating this tube from the bracket 68 at bolt 69. The tube 17 is clamped at its upper end to lever 25 by a clamping means 70, likewise insulated from arm 25. The lower end of tube 17 is inserted in the nozzle socket 71. This nozzle socket is preferably of low electrical resistance and preferably non-magnetic. It is tapped on the lower side to receive the nozzle 20, and is provided with a bolt by means of which the welding current cable 72 is secured thereto. It is likewise provided with a shank 73 by which it is secured to but insulated from lever 25. The nozzle 20 is secured in the socket and fixed against turning by a check nut. The nozzle 20 is shown in the drawings as curved, but it may be straight, or in fact, may be formed integral with tube 17. If a curved electrode is used, the bend is made in the direction travelled in welding.

The work to be welded being usually connected to ground and the other side of the line being connected to the electrode, it is evident that to avoid a short circuit those parts of the machine having electrical connection with the electrode must be insulated from those parts which are grounded. The frame of the carriage will generally be grounded through its supporting wheels. As the welding head 11 is in contact with the wire electrode it must therefore be insulated from the carriage. This insulation is secured at 12. The wire reel holding the metal electrode needs likewise to be insulated from the carriage. Bracket 28 is in electrical contact with the carriage and consequently the electrode tube 16 must be insulated from it. For the same reason tube 17 must be insulated from lever 25. The bearing bracket of the adjustable throw crank 22, which is attached to the frame work of the carriage, is insulated from the welding head by an insulating coupling 74.

It will be noted that the self-contained nature of my carriage is such that it can be manufactured completed as a unit and marketed for application to various welding problems for which a welding head alone does not meet the requirements. It can be removed from the machine with its fixed control panel and placed upon any suitable track upon which its wheels will roll, connected to a source of current supply, and thereby applied to a wide variety of welding work from seams of small tanks to seams of the largest tanks, or the plating seams on the hull of a ship on the ways in a shipyard.

While I have described my invention particularly as applied to electric arc welding with a metallic electrode, it will be obvious to those skilled in the art that my invention is not limited in its broader aspects to such welding, but that many features thereof are capable of general application in the arc welding machine art.

What I claim as new and desire to secure by Letters Patent of the United States, is:—

1. In an automatic arc welding machine wherein a welding head and the work are arranged to move relatively, means for oscillating an electrode at the welding arc comprising an adjustable throw crank, a rocker shaft, a support for said shaft, and a plurality of levers mounted on said shaft, and means for changing the position of two of said levers relatively to each other to adjust the alignment of said oscillating electrode relatively to the work.

2. In an automatic arc welding machine wherein a welding head and the work are arranged to move relatively, means for oscillating an electrode at the welding arc comprising a rocker shaft, a support for said shaft, a plurality of levers mounted on said shaft, an adjustable throw crank having a pin spring pressed to a central position, and means for displacing said pin eccentrically while the crank is in motion, and means for changing the position of two of said levers relatively to each other to adjust the alignment of said oscillating electrode relatively to the work.

3. In an automatic arc welding machine wherein a welding head and the work are arranged to move relatively, means for feeding an electrode toward the work, means for oscillating said electrode at the welding arc comprising an adjustable throw crank, a rocker shaft, a support for said shaft, and a plurality of levers mounted on said shaft, and means for changing the position of two of said levers relatively to each other to adjust the alignment of said oscillating electrode relatively to the work.

4. In an automatic arc welding machine wherein a welding head and the work are arranged to move relatively, means for feeding an electrode toward the work, and means for oscillating said electrode at the welding arc comprising a rocker shaft, a support for said shaft, a plurality of levers mounted on said shaft, an adjustable throw crank having a pin spring pressed to a central position, and means for displacing said pin eccentrically while the crank is in motion.

5. In an automatic arc welding machine wherein a welding head and the work are arranged to move relatively, means for feeding an electrode toward the work, and means for oscillating said electrode at the welding arc comprising a rocker shaft, a support for said shaft, a plurality of levers mounted on said shaft, an adjustable throw crank having a pin spring pressed to a central position, and an adjusting screw located in the shaft of said crank to secure an eccentric displacement of said pin.

6. In an automatic arc welding machine wherein a welding head and the work are arranged to move relatively, means for feeding an electrode toward the work, means for oscillating said electrode at the welding arc comprising a rocker shaft, a support for said shaft, a plurality of levers mounted on said shaft, an adjustable throw crank having a pin spring pressed to a central position, and means for displacing said pin eccentrically while the crank is in motion, and means for changing the position of two of said levers relatively to each other to adjust the alignment of said oscillating electrode relatively to the work.

7. In an automatic electric arc welding machine wherein a welding head and the work are arranged to be moved relatively, means for feeding an electrode to the work, a lever, a pivot support to which said lever is adjustably clamped, and a plurality of conduits placed end to end in the machine for guiding said electrode from said feeding means to the work, one of which is mounted on said lever and supported to swing about the axis of said pivot, said conduits having the front portions of their adjacent ends removed at the axis of rotation to permit a long gradual bend of the electrode wire when the lever and the lower conduit are moved in a forward direction away from their normal operative position.

8. In an automatic arc welding machine wherein a welding head and the work are arranged to move relatively, means for feeding an electrode toward the work, means for oscillating said electrode at the welding arc comprising an adjustable throw crank, a rocker shaft, a support for said shaft and a plurality of levers mounted on said shaft, means for changing the position of two of said levers relatively to each other to adjust the alignment of said oscillating electrode relatively to the work, means for adjusting a third of said levers on said rocker shaft, and a conduit for guiding said electrode to the work supported on said third lever.

9. In an automatic arc welding machine wherein the welding head and the work are arranged to move relatively, means for feeding an electrode to the work, means for oscillating said electrode at the welding arc comprising an adjustable throw crank, a rocker shaft, a support for said shaft, and three levers mounted on said shaft, means for changing the relative position of one of said levers supported on said shaft to another secured thereto, means for adjustably clamping the third lever on said shaft, and a conduit for guiding said electrode to the work supported on said third lever.

10. In an automatic arc welding machine wherein a welding head and the work are arranged to move relatively, an electrode oscillating means comprising an adjustable throw crank having a pin spring-pressed to a central position and means for displacing said pin eccentrically while the crank is in motion.

In witness whereof, I have hereunto set my hand this tenth day of September, 1925.

FRANK A. HAUGHTON.